US009189400B2

(12) United States Patent
Kim

(10) Patent No.: US 9,189,400 B2
(45) Date of Patent: *Nov. 17, 2015

(54) HYBRID ACTIVE MEMORY PROCESSOR SYSTEM

(71) Applicant: IP Cube Partners (ICP) Co., Ltd., Seoul (KR)

(72) Inventor: Moon J. Kim, Wappingers Falls, NY (US)

(73) Assignee: IP Cube Partners (ICP) Co., Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/082,713

(22) Filed: Nov. 18, 2013

(65) Prior Publication Data

US 2014/0075119 A1    Mar. 13, 2014

Related U.S. Application Data

(63) Continuation of application No. 12/955,028, filed on Nov. 29, 2010, now Pat. No. 8,589,628.

(51) Int. Cl.
*G06F 12/08* (2006.01)
(52) U.S. Cl.
CPC ........ *G06F 12/0802* (2013.01); *G06F 12/0877* (2013.01); *G06F 2212/601* (2013.01)

(58) Field of Classification Search
None
See application file for complete search history.

(56) References Cited

U.S. PATENT DOCUMENTS

2010/0299553 A1    11/2010 Cen

OTHER PUBLICATIONS

Kevin Verbrugge, USPTO Office Action, U.S. Appl. No. 12/955,028, Notification Date Mar. 7, 2013, 14 pages.
Kevin Verbrugge, USPTO Notice of Allowance and Fee(s) Due, U.S. Appl. No. 12/955,028, Date Mailed Jul. 18, 2013, 13 pages.

*Primary Examiner* — Kevin Verbrugge
(74) *Attorney, Agent, or Firm* — Maxine L. Barasch; Keohane & D'Alessandro, PLLC

(57) ABSTRACT

In general, the present invention relates to data cache processing. Specifically, the present invention relates to a system that provides reconfigurable dynamic cache which varies the operation strategy of cache memory based on the demand from the applications originating from different external general processor cores, along with functions of a virtualized hybrid core system. The system includes receiving a data request, selecting an operational mode based on the data request and a predefined selection algorithm, and processing the data request based on the selected operational mode. The present invention is further configured to enable processing core and memory utilization by external systems through virtualization.

20 Claims, 8 Drawing Sheets

HYBRID ACTIVE MEMORY PROCESSOR SYSTEM

RELATED U.S. APPLICATION DATA

The present patent document is a continuation of U.S. patent application Ser. No. 12/955,028 filed Nov. 29, 2010, entitled "HYBRID ACTIVE MEMORY PROCESSOR SYSTEM", the entire contents of which is incorporated herein by reference.

TECHNICAL FIELD

The present invention relates to data cache processing. Specifically, the present invention relates to a system that provides reconfigurable dynamic cache which varies the operation strategy of cache memory based on the demand from applications. The present invention is configured to delegate computational or memory resource needs to a plurality of sub-processing cores for processing. The present invention is further configured to enable processing core and memory utilization by external systems through virtualization.

BACKGROUND

The performance of memory-intensive applications is often limited by how fast the memory system can provide needed data. Latency between processors and memory is often the performance bottleneck in application performance. Multiple processor cores require highly efficient cache operation with wide memory bandwidth.

In today's world, digital system performance and complexity are continually increasing due to technology scaling and three-dimensional (3D) integration. Current designs stick to conventional cache approaches. On-demand, on-chip memory support is critical to make the most of these developments. As the gap widens between processor speed and memory access time, cache architecture must keep up with digital system development trends.

SUMMARY

In general, embodiments of the invention relate to processing a data request in a caching system. Specifically, a system is presented that provides reconfigurable dynamic cache which varies the operation strategy of cache memory based on the demand from the applications originating from different external general processor cores, along with functions of a virtualized hybrid core system. The system includes receiving a data request, selecting an operational mode based on the data request and a predefined selection algorithm, and processing the data request based on the selected operational mode.

In one embodiment, there is a method for processing a data request in a caching system. In this embodiment, the method comprises: receiving a data request; selecting from at least one operational mode based on the data request and a predefined selection algorithm; processing the data request or delegating the data request across a common path structure for processing based on the selected operational mode; and returning a response to the sender.

In a second embodiment, there is a system for processing a data request in a caching system. In this embodiment, the system comprises: a memory processing element, comprising: a cache memory, having a plurality of memory blocks; a front end coupled to cache memory by at least one bus, comprising: an input/output component configured to receive a data request and return a response to the sender; a controller component configured to: select from at least one operational mode based on the data request and a predefined selection algorithm; and process the data request or delegate the data request across a common databus structure for processing based on the selected operational mode.

In a third embodiment, there is a computer-readable medium storing computer instructions which, when executed, enables a computer system to process a data request in a caching system, the computer readable medium comprising: program code for causing a computer system to: receive a data request; select from at least one operational mode based on the data request and a predefined selection algorithm; process the data request or delegating the data request for processing across a common path structure based on the selected operational mode; and return a response to the sender.

In a fourth embodiment, there exists a method for processing a data request in a caching system. In this embodiment, a computer infrastructure is provided and is operable to: receive a data request; select from at least one operational mode based on the data request and a predefined selection algorithm; process the data request or delegate the data request for processing across a common path structure based on the selected operational mode; and return a response to the sender.

BRIEF DESCRIPTION OF THE DRAWINGS

These and other features of this invention will be more readily understood from the following detailed description of the various aspects of the invention taken in conjunction with the accompanying drawings in which.

Figure 1:
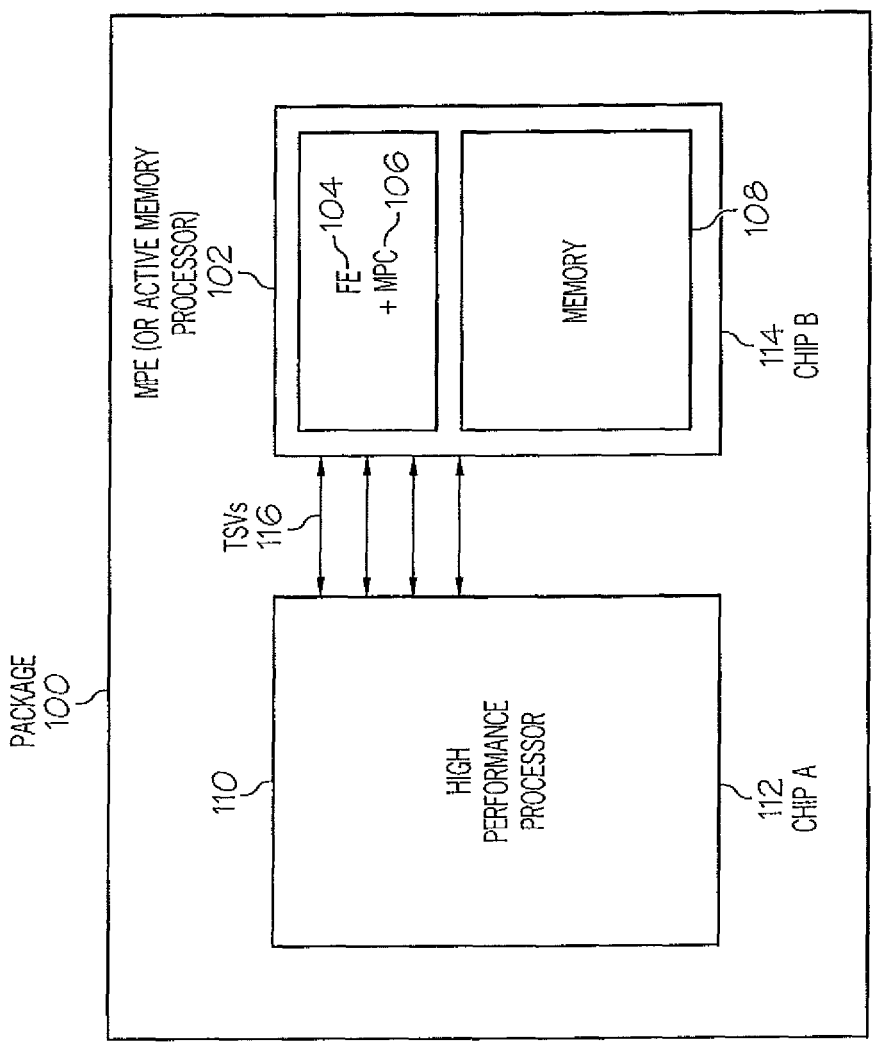
FIG. 1 illustrates a high-performance processor and active memory processor.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an active memory processor system and method. Specifically, this invention allows new functions of a virtualized hybrid core system and reconfigurable dynamic cache which varies the operation strategy of cache memory based on the demands of applications originating from different external general processor cores.

Cache is a temporary storage area where frequently used data can be stored for rapid access. When a processor needs to read from or write to a location in main memory, it first checks to determine if a copy of that data resides in cache. If so, the processor reads from or writes to the cache, which is much faster than accessing main memory. In other words, the more requests that can be served by cache, the faster the overall system performance will be.

Referring now to FIG. 1, a high-performance processor and active memory processor is shown. Package 100 (or chip carrier) houses Chip A 112 and Chip B 114. High performance processor 110 resides on Chip A 112. MPE (or memory processing element) 102 resides on Chip B 114. MPE 102 includes front end (FE) 104 and memory processing core (MPC) 106. Chip A 112 and Chip B 114 are connected with a set of TSVs 116. A TSV, or through-silicon-vias, is a vertical electrical connection (via) passing completely through a thin slice or rectangle of silicon. The components of MPE 102 are discussed in detail below.

Figure 2:
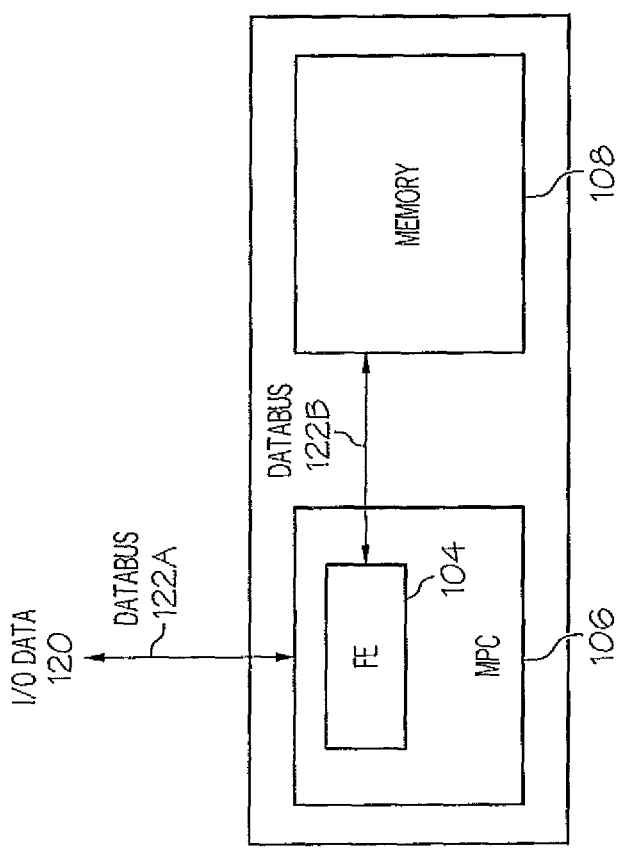
FIG. 2 illustrates a more detailed view of a memory processing element.

FIG. 2 depicts a more detailed view of MPE 102. FE 104 receives read/write requests from a plurality of processors and returns applicable responses (I/O 120) via databus 122A. A databus is a subsystem that transfers data between components. FE 104 communicates with memory 108 via databus 122B. MPE 102 is capable of supporting a plurality of memory types which are coupled to MPC 106 via one or more databuses. Memory block relationships are defined by MPC 106.

Figure 3:
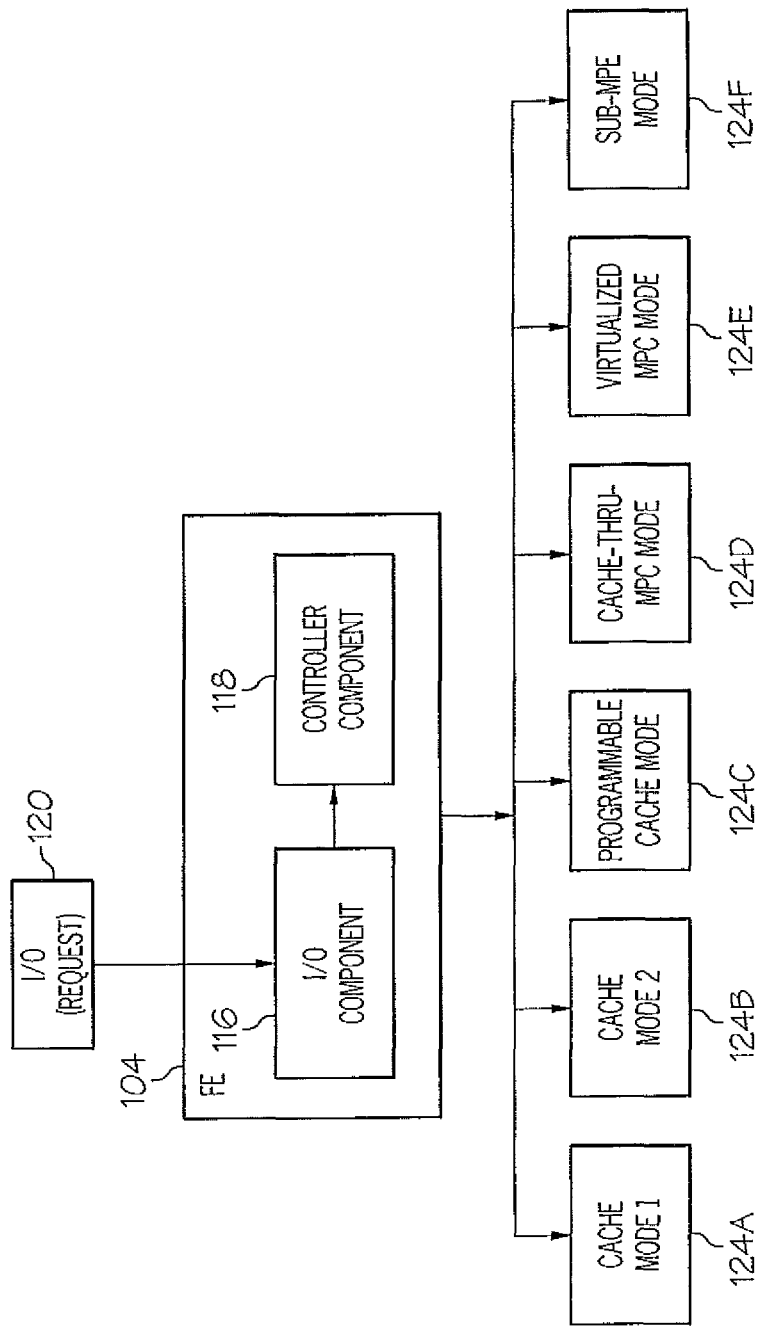
FIG. 3 illustrates a schematic process diagram of a memory front end.

FIG. 3 depicts a process schematic diagram of FE 104. I/O component 116 receives a data request from a processor. FE 104 includes I/O component 116 and controller component 118. FE 104 has two primary responsibilities: (1) managing the flow of data requests and responses, and (2) forwarding each data request that is received using the correct cache mode (described in detail below). I/O component 116 handles all input/output traffic. Controller component 118 handles the processing of each data request.

Controller component 118 performs data request 120 utilizing (at least) one of the following options based on the type of request and application demands: cache modes 1 or 2 (124A, 124B), parametric programmable cache mode (124C), MPC for Cache-Thru-MPC mode (124D), virtualized MPC mode (124E), and sub-MPE mode (124F) for processing.

If the selected option is cache modes 1 or 2 (124A, 124B), or parametric programmable cache mode 124C, then the data request is a cache search request which is performed by controller component 118. If the selected option is Cache-Thru-MPC mode 124D or virtualized MPC mode 124E, then the data request is forwarded to MPC 106 for processing. Sub-MPE mode 124F provides capabilities for virtualized processing and virtualized memory sharing (discussed below). The modes listed are illustrative only and not intended to be limiting. Additional modes may be used within the system and methods described herein.

The first option includes cache mode 1 and cache mode 2 (124A, 124B). Cache modes 1 and 2 operate in a similar manner. Controller component 118 performs the cache search based on the request and the selected mode. If the data is contained in the cache (cache hit), then the request is served by reading the cache. If the data is not contained in cache (cache miss), a fetch is initiated to fetch the data from the next level cache (either internal or external). Cache modes 1 and 2 (124A, 124B) are each pre-programmed modes having several fixed cache operation scenarios and logic. Each is configured using commonly used settings relating to how the cache is arranged internally to store the cached data to increase the effectiveness of the cache.

The second option is parametric programmable cache mode 124C. Like cache modes 1 and 2 (124A, 124B), a cache search is performed based on the request and the caching logic of programmable cache mode 124C. Controller component 118 returns the result (cache hit) or generates a cache miss to fetch the next level cache (either internal or external). However, unlike the earlier detailed cache modes, programmable cache mode 124C is not pre-programmed. This mode accepts parameters from MPC 106 and alters its caching logic based on the received parameters. A programmable cache mode is desirable because it offers inherent flexibility by permitting the selection and/or modification of cache settings.

The third option is cache-thru-MPC mode 124D. In this mode, FE 104 forwards the cache request directly to MPC 106. MPC 106 is configured to use its own caching strategy based on the request. MPC 106 performs the cache operation itself and returns the result to the sender of the request.

The fourth option is virtualized MPC mode 124E. In this mode, FE 104 forwards the data request directly to MPC 106. The data request under this mode is not a cache request, but a request for data processing. This option allows for MPC 106 to process virtualized threads requested from external cores as part of a hybrid and multi-core system. MPC 106 and its functions, including(?) cache-thru-MPC mode 124D and virtualized MPC mode 124E.

Figure 4:
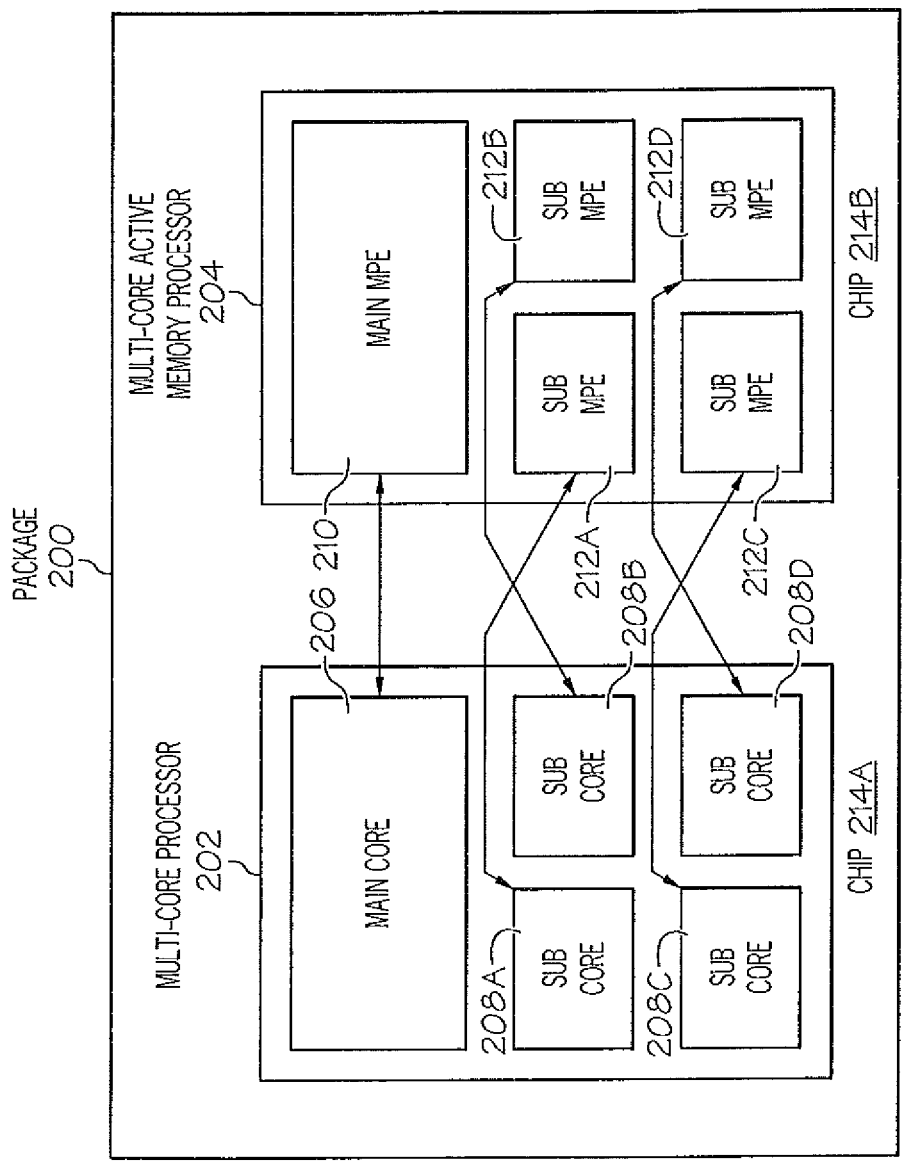
FIG. 4 illustrates a schematic diagram of a package containing a multi-core processor and a multi-core active memory processor.

The fifth option is sub-MPE mode 124F which provides the capability for virtualized processing and memory sharing. FIG. 4 illustrates package 200 containing multi-core processor 202 on chip 214A, and multi-core active memory processor 204 on chip 214B. Multi-core processor 202 includes main processor core 206 and four sub-processor cores (208A, 208B, 208C, 208D). Multi-core active memory processor 204 includes main MPE 210 and four sub-MPEs (212A, 212B, 212C, 212D). Multiple MPEs are organized as Main MPE 210 having one or more sub-MPEs to define a collaborative relationship. Each MPE consists of a front end (FE), memory processing core (MPC), and memory. The relationship allows main MPE 210 to lease memory to other MPEs as cache or memory space, or assist in processing of a memory-intensive task.

Although each sub-MPE may be set up similarly to the main MPE, the main MPE maintains control over its sub-MPEs. Main MPE is capable of delegating one or more of its roles or functions to sub-MPEs via the front end. Main MPE 210 has the option of making a sub-MPE autonomous as encapsulated cache or set up a collaborative relationship between the main MPE and sub-MPE.

Main MPE 210 is also tasked with grouping its sub-MPEs. Groups form either a cascaded chain or tree structure in I/O responses. Each group has its own mapping to external input/output. Main MPE updates groups and grouping relationships based on predefined criteria including, but not limited to, proximity, speed, power, consumption, and type and size of each sub-MPE, in order to meet application demands in real time.

Figure 5:
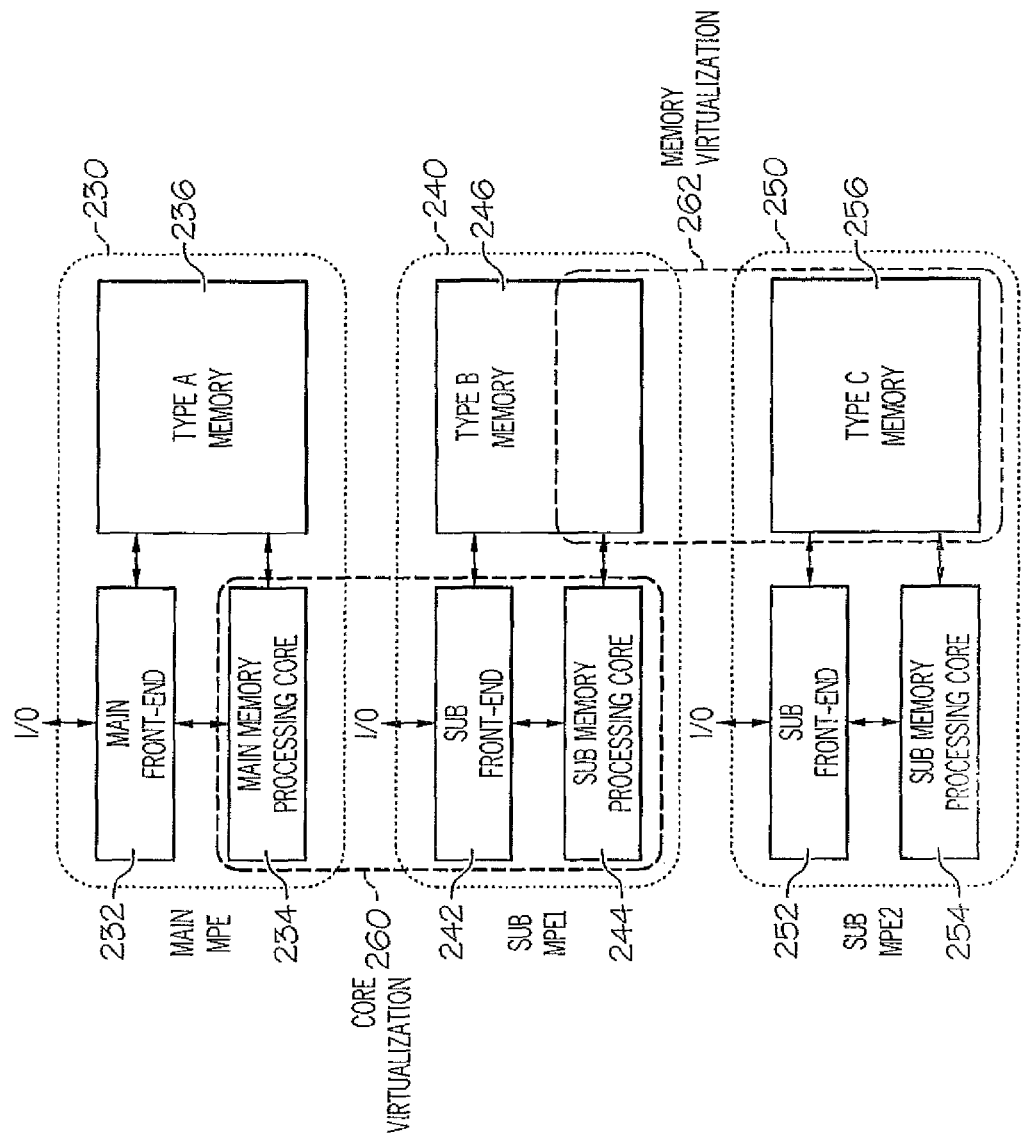
FIG. 5 illustrates a schematic diagram of a package containing a multi-core processor and a multi-core active memory processor.

FIG. 5 illustrates core virtualization and memory virtualization. In this example, three MPEs are depicted. Main MPE 230 and two sub-MPEs (240 and 250). MPE 230 includes FE 232, MPC 234, and memory 236. Sub-MPE 240 includes FE 242, MPC 244, and memory 246. Sub-MPE 250 includes FE 252, MPC 254, and memory 256. Main MPE 230 is configured to delegate some of its processing needs to sub-MPE 240 (core virtualization). Main MPE 230 is configured to requisition sub-MPE 250 for memory sharing based on demands from applications (memory virtualization).

MPE core and memory are virtualized through FE setup and MPE core management. A main MPE core is configured to delegate computational or memory resource needs to a plurality of sub-processing cores to satisfy application demands. MPE memory is virtualized, under MPE core supervision, to share the memory space with other MPE memory and MPE cores. Core virtualization is based on threads. Core and memory virtualization allows for dividing virtualization resourcing needs with different proportions going to one or more entities. Memory virtualization is controlled and logged continuously (in real time and memory space allocation) with a table kept in the MPE.

Figure 6:
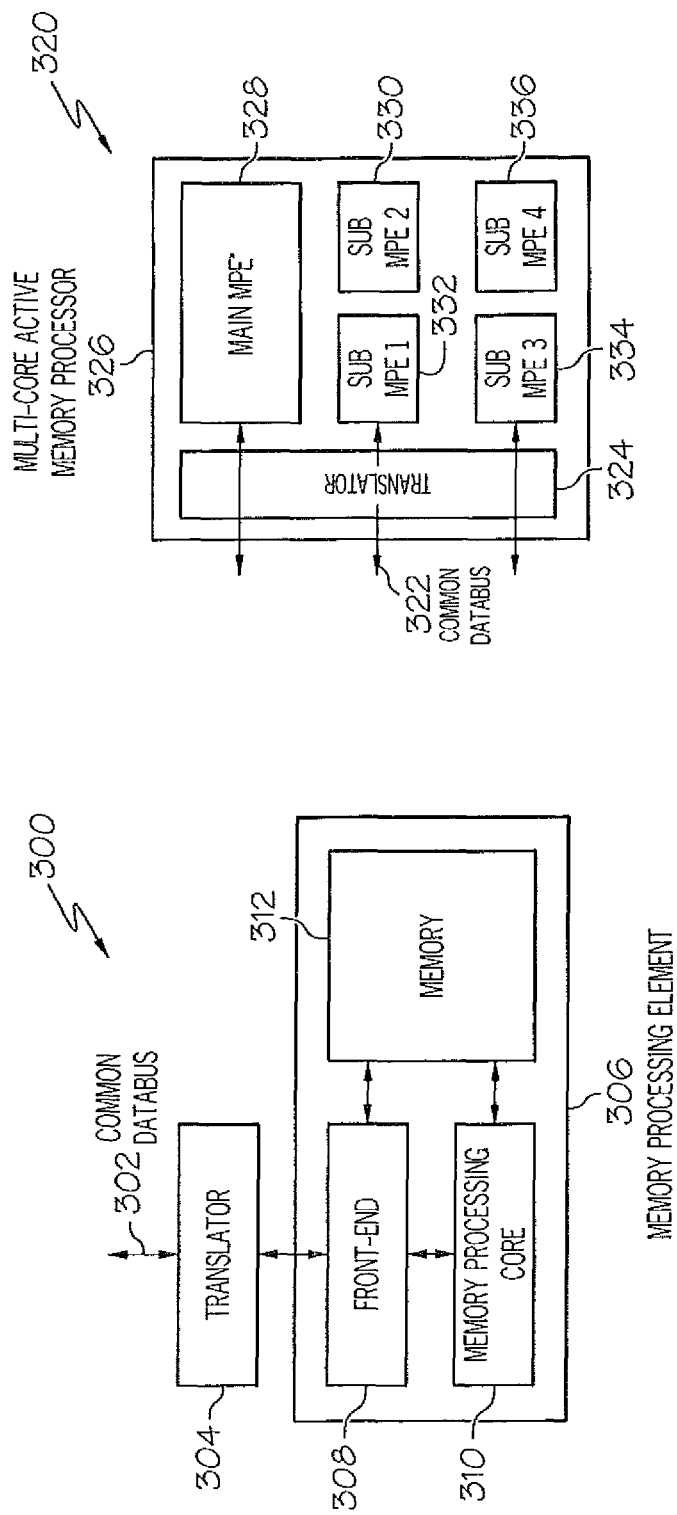
FIG. 6 illustrates schematic diagrams of communication structures.

Communication among different systems can be difficult. FIG. 6 depicts two example structures which provide reliable communication pathways. Structure 300 includes MPE 306, translator 304, and common databus 302 which connects to an external processor (not pictured). MPE 306 includes FE 308, MPC 310, and memory 312. Structure 320 includes multi-core active memory processor 326 and common databus 322. Multi-core active memory processor 326 includes main translator 324, main MPE 328, and for sub-MPEs (330, 332, 334, and 336).

System and software integration are made difficult due to diverse processor core and memory technologies. Diverse system designs promote business independence which is necessary because each system needs customization and optimization to meet business needs. Having a common databus and translator structure enables multi-core processor hardware integration in a standardized manner. It provides an integration method for operating systems and application level platforms. Hybrid and heterogeneous MPCs, along with external processor cores, are able to establish virtualization through a common databus, encapsulation, and translation. The common database allows integration among all heterogeneous elements (MPEs, MPCs, sub-MPEs, sub-MPCs, etc.) of a multi-core hybrid active memory processor (AMP) and a multi-core processor (MCP). Each element (MPE, MPC, sub-MPE, and sub-MPC, etc.) implements a translator. Translators provide information relating to the requested element and data request including address, data format, virtualization, and data type. Use of data types allows bi-directional transfer of data requests.

Figure 7:
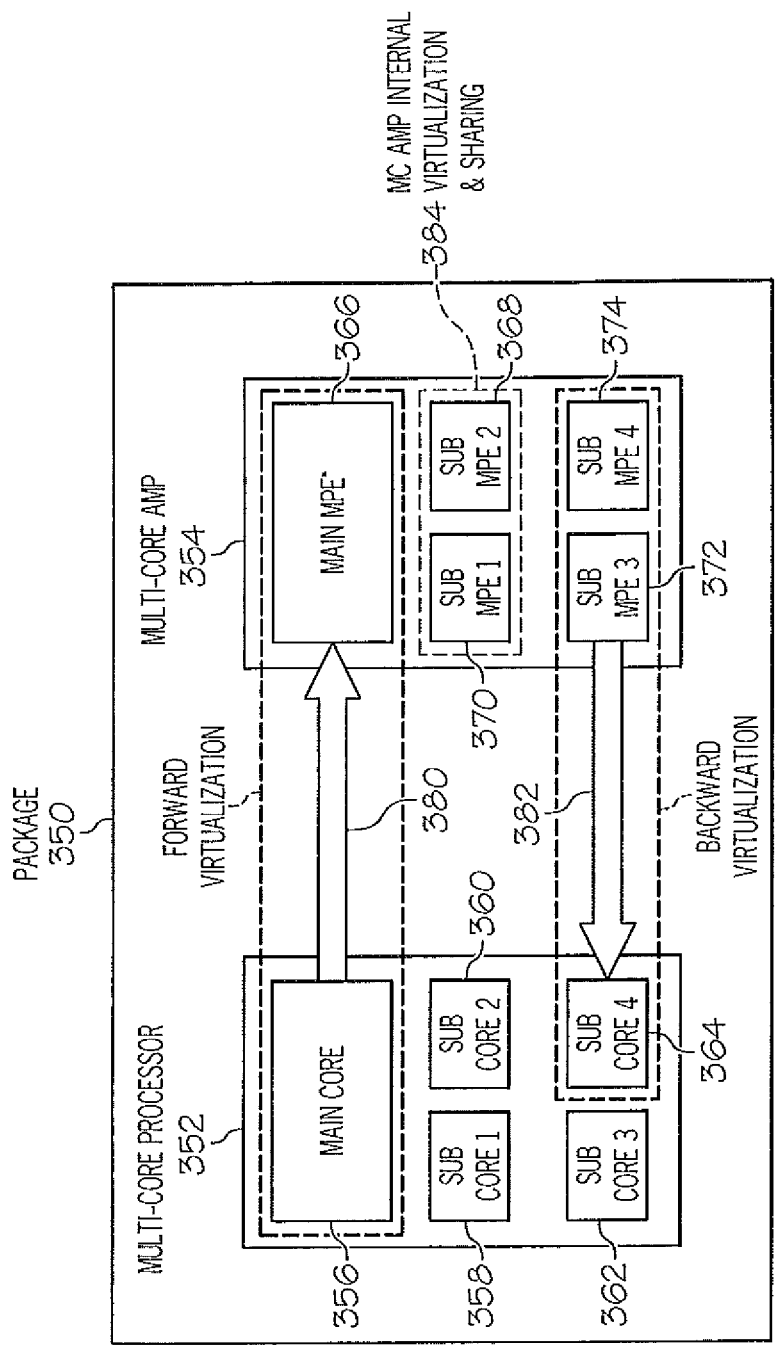
FIG. 7 illustrates schematic diagrams depicting examples of virtualization.

FIG. 7 depicts schematic diagrams depicting virtualization examples. MCP 352 includes MPC 356, and sub-MPCs (358, 360, 362, and 364). Multi-core AMP 350 includes main MPE 366 and sub-MPEs (368, 370, 372, and 374). Virtualization may be performed internally as shown in MC AMP internal virtualization and sharing 384. Sub-MPE 368 and sub-MPE 370 share memory resources. Virtualizations may also be performed externally across a common database. As depicted in forward virtualization 380, main core 356 is able to delegate computational and memory needs to main MPE 366. In backward virtualization 382, sub-MPE 372 and sub-MPE 374 are able to requisition sub-Core 362 and sub-Core 364 based on application demands.

Figure 8:
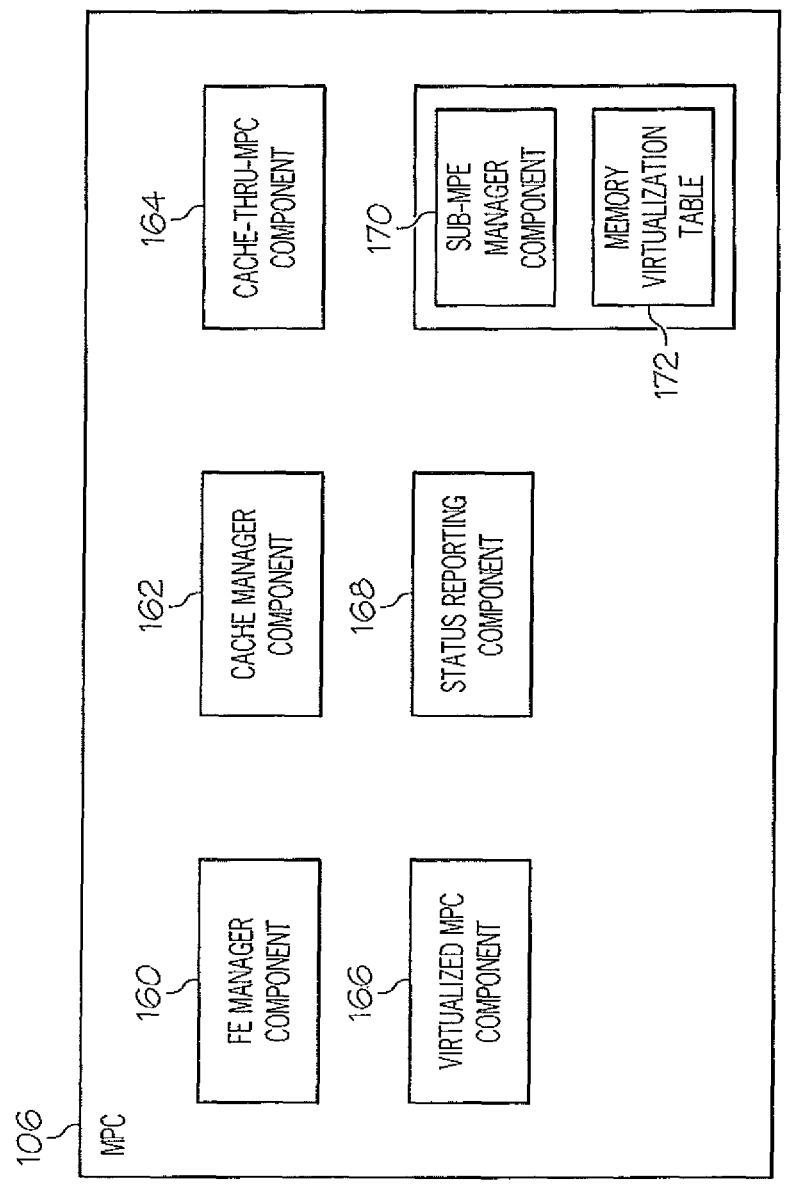
FIG. 8 illustrates a more detailed view of a memory processing core.

FIG. 8 depicts a detailed view of MPC 106. MPC 160 includes FE manager component 160, cache manager component 162, cache-thru-MPC component 164, virtualized MPC component 166, status report component 168, and sub-MPE manager component 170. FE manager component 160 and cache manager component 162 control caching operations by dynamically reconfiguring FE 104 behavior and dynamically adjusting cache memory 108 configuration.

FE manager component 160 monitors FE 104 activity, analyzes FE 104 trends and patterns, and updates FE 104 programmable strategies in order to make processing more efficient. FE manager component 160 controls caching strategies by controlling FE 104 cache modes. FE manager component 160 makes cache strategy decisions based on performance and power variation. The performance of cache can be quantified by the speed of the cache subsystem, along with hit and miss rates.

MPC 106 monitors cache behavior, analyzes cache behavior, and is capable of reconfiguring cache dynamically in real-time based on the demand from the applications originating from different external general processor cores. Cache manager component 162 is configured to make changes to cache size, association, and manner, when necessary. Although increasing or reconfiguring cache size, associativity, and manner can improve the cache hit rate, it can make cache access time longer. It is the job of cache manager component 162 to find a workable balance. Cache manager component 162 is further configured to dynamically control the settings of programmable cache mode 124C through parameters. The settings relate to how the cache is arranged internally.

Cache-thru-MPC component 164 receives a cache request from FE 104. Cache-thru-MPC component 164 is configured to use its own caching strategy when serving the request. Caching strategies under cache-thru-MPC mode are configurable and are programmed into Cache-thru-MPC component 164. Cache-thru-MPC component 164 performs the cache operation itself and returns the result to the sender of the request.

Virtualized MPC component 166 operates as a generic processor with a large and fast memory. The goal of virtualized processing by virtualized MPC component 166 is to reduce the number of transactions that are required to be processed. In other words, the purpose of virtualized MPC mode 124E is to combine many simple read/write operations into one operation which is performed by the MPC. Virtualized MPC component 166 is pre-programmed to handle custom types of transactions which are performed on the memory side.

For example, processor A1 has a memory intensive job it is performing. Processor A1 sends a request to MPC 106 to perform a virtualized thread for processor A1 with a block of memory assigned for virtual thread of processor A1. Rather than being a cache for processor A1, MPC 106 directly performs the processor's operation, making the processing more efficient. Still, the processor can have cache relations with MPC 106, and MPC 106 can still serve other cores with remaining memory. In this example, processor A1 sees MPC 106 as a cache and a sub-processor at the same time.

Sub-MPE manager component 170 of the main MPE controls its sub-MPEs. Computational resource sharing and memory sharing are virtualized by sub-MPE manager component through FE setup. FE 104 of main MPE identifies scenarios when the main MPE needs to delegate either memory tasks or computational tasks, or both. Sub-MPE manager component 170 controls grouping of sub-MPEs. Physical memory assignments are updated dynamically through memory virtualization as demands change in real time. Memory virtualization is controlled and logged continuously (in time and memory space allocations) into memory virtualization table 172 by sub-MPE manager component 170.

Status reporting component 168 transmits status information to external entities. For example, MPC 106 wants other processor cores and MPCs to know that MPC 106 is not just a cache block, but also a memory processing core (MPC). External entities include other cores and MPCs that share databus 122A. There are several methods for reporting including using: (1) a hybrid databus with data abstraction; (2) a double-acting MPC as a cache and a sub-processor; and (3) an MPE that collects MPE 106 status information. MPC 106 responds to other processor cores as if it is a cache and a processor at the same time. MPC 106 status is exchanged and recognized by observing cache and processor entities.

It should be understood that the present invention can be realized in hardware, software, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context, mean any expression, in any language, code, or notation, of a set of instructions intended to cause a system having an information processing capability to perform a particular function either directly or after either or both of the following: (a) conversion to another language, code, or notation; and/or (b) reproduction in a different material form.

Program code embodied on a computer readable medium may be transmitted using any appropriate medium including, but not limited to, wireless, wireline, optical fiber cable, radio-frequency (RF), etc., or any suitable combination of the foregoing.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for processing a data request in a memory control system, comprising:
   receiving a data request;
   selecting an operational mode from at least one operational mode based on the data request and a predefined selection algorithm, the at least one operational mode comprising at least one of a cache mode, a parametric programmable cache mode, a main processing core (MPC) for Cache-Thru-MPC mode, a virtualized MPC mode, or a sub-memory processing element (MPE) mode;
   processing the data request or delegating the data request across a common path structure for processing based on the selected operational mode; and
   returning a response to the sender.

2. The method of claim 1, further comprising:
   monitoring the selecting activity;
   analyzing the selecting activity; and
   dynamically updating the selection algorithm based on the analysis.

3. The method of claim 1, wherein in response to the at least one selected operational mode comprising the cache mode or the parametric programmable cache mode, processing the data request by a controller component.

4. The method of claim 1, wherein in response to the selected operational mode comprising at least one of cache-thru-MPC mode or virtualized MPC mode, delegating the data request to MPC for processing.

5. The method of claim 1, wherein the sub-MPE mode provides capabilities for virtualized processing and virtualized memory sharing.

6. The method of claim 1, wherein the common path structure allows for bi-directional communication and delegation of data requests.

7. The method of claim 1, wherein the processing step includes performing a cache search when the data request is a cache search request based on the selected operational mode, the selected operational mode having caching logic.

8. A system for processing a data request in a memory control system, comprising:
   a memory processing element, comprising:
      a cache memory, comprising a plurality of memory blocks;
      a front end coupled to cache memory by at least one bus, comprising:
         an input/output component configured to receive a data request and return a response to the sender;
         a controller component configured to:
            select an operational mode from at least one operational mode based on the data request and a predefined selection algorithm, the at least one operational mode comprising at least one of a cache mode, a parametric programmable cache mode, a main processing core (MPC) for Cache-Thru-MPC mode, a virtualized MPC mode, or a sub-memory processing element (MPE) mode; and
            process the data request or delegate the data request for processing across a common databus structure based on the selected operational mode.

9. The system of claim 8, the memory processing element further comprising:
   a memory processing core, comprising:
      a front end manager component configured to monitor front end activity, analyze the front end activity, and dynamically update the selection algorithm based on the front end activity analysis.

10. The system of claim 8, wherein at least one of the operational modes is configured to delegate the data request to a sub-processor.

11. The system of claim 10, wherein the delegating step includes delegating a cache search request for processing.

12. The system of claim 10, wherein the delegating step includes delegating a data processing request for processing.

13. The system of claim 8, wherein the common databus structure allows for bi-directional communication and delegation of data requests.

14. The system of claim 8, the memory processing core further comprising a sub-processor component configured to control a plurality of sub-processors for delegating a data request received by the memory processing element.

15. The system of claim 14, the sub-processor component further configured to:
    monitor data relating to cache search when the cache search is delegated for processing; and
    store the data in a data storage area.

16. The system of claim 8, the memory processing core further comprising a status reporting component configured to notify external entities of functions performed by the memory processing element.

17. A computer-readable device storing computer instructions which, when executed, enables a computer system to process a data request in a memory control system, the computer instructions comprising:
    receiving a data request;
    selecting an operational mode from at least one operational mode based on the data request and a predefined selection algorithm, the at least one operational mode comprising at least one of a cache mode, a parametric programmable cache mode, a main processing core (MPC) for Cache-Thru-MPC mode, a virtualized MPC mode, or a sub-memory processing element (MPE) mode;
    processing the data request or delegating the data request for processing across a common path structure based on the selected operational mode; and
    returning a response to the sender.

18. The computer-readable device of claim 17, wherein the delegating step includes delegating a cache search request for processing.

19. The computer-readable device of claim 17, wherein the delegating step includes delegating a data processing request for processing.

20. The computer-readable device of claim 17, wherein the common path structure allows for bi-directional communication and delegation of data requests.

* * * * *